Patented Dec. 17, 1935

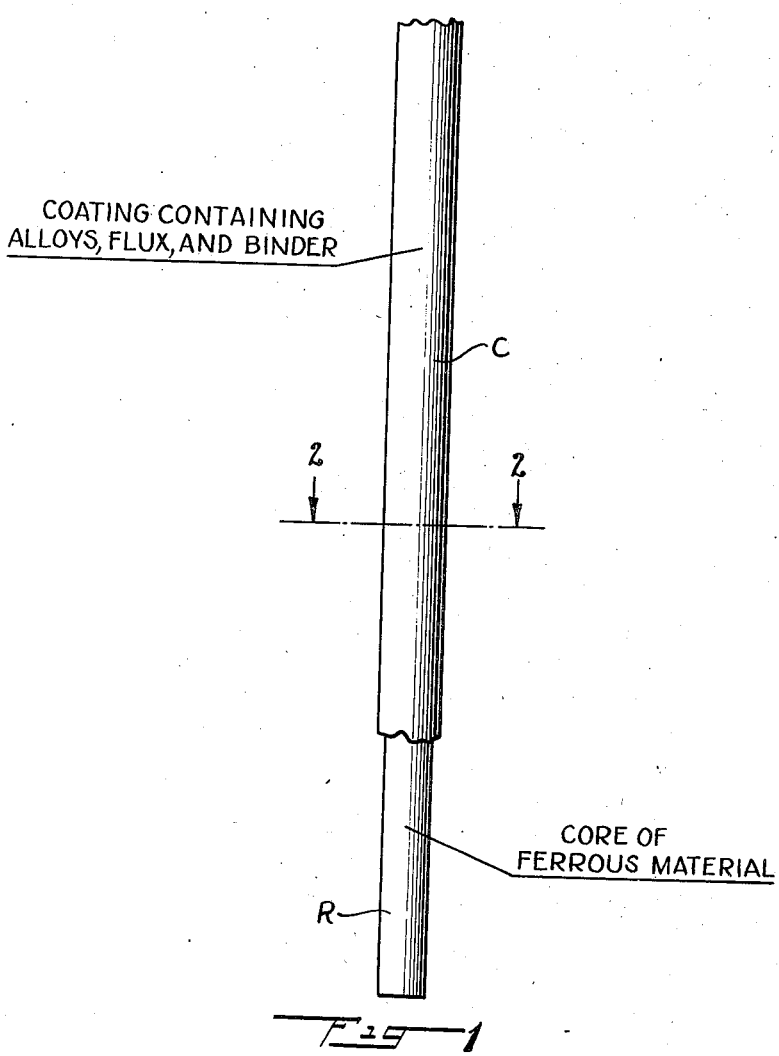

2,024,992

UNITED STATES PATENT OFFICE 2,024,992

COMPOSITE WELDING ROD FOR HARD FACING

William A. Wissler and Wilber B. Miller, Niagara Falls, N. Y., assignors to Haynes Stellite Company, a corporation of Indiana Application May 29, 1935, Serial No. 24,004

7 Claims. (Cl. 219—8)

This invention relates to welding rods or electrodes and especially to welding rods which are used in forming hard facings on metallic articles. The desired facing in general would contain chromium from 3% to 40%, manganese from 1% to 8%, carbon 0.5% to 3% and silicon from 0% to 3%, the balance being principally iron, but may include tungsten, molybdenum, nickel, cobalt, vanadium, and the like. The welding rods are especially adapted for use in connection with arc welding but are also of value in oxy-acetylene welding.

An object of our invention is to produce welding rods which will give a desired deposit of hard material and which may contain greater amounts of alloys than would be possible or economical were it attempted to use a rolled rod containing all of the alloy constituent in the core. Another object of our invention is to produce a rod which will give the desired deposit and which will be inexpensive and simple to manufacture.

Other objects of our invention will in part be evident and will in part appear in the following specification having reference to the accompanying drawing in which Fig. 1 is a perspective view of a welding rod illustrating one embodiment of our invention, a part of the coating being broken away; and Fig. 2 is a cross section of a welding rod taken on line 2—2 of Fig. 1.

Deposits of weld metal containing from 3% to 40% chromium, 1% to 8% manganese, 0.5% to 3% carbon, 0% to 3% silicon, and the balance principally iron, have very desirable wear-resisting properties. However, it is impossible, or at least commercially impracticable, to roll rods containing the higher proportion of alloy constituents. For example, the welding rods at present available contain carbon 0.9% to 1.1%, manganese 3.75% to 4.50%, silicon 0.5% to 0.7% and chromium 11% to 13%. Any attempt to include appreciably larger amounts of carbon, chromium and manganese would necessitate the use of cast or sintered rods and even this procedure would be very difficult and expensive.

In order to produce welding rods or electrodes of compositions that would not otherwise be practicable on account of manufacturing limitations we have produced a composite electrode consisting of two parts, a central metal rod or core and a coating containing the necessary alloys together with arc stabilizing material. The core may be of either iron or plain carbon steel or it may contain part of the elements desired in the finished weld deposit, but would not contain sufficient quantities of such elements to prevent the commercial rolling or drawing of the metal core rod. The coating contains the remainder of the needed elements together with flux and bonding ingredients. For fluxing constituents slip clay, calcium carbonate, rutile and manganese ores in various proportions are useful. Such a rod is shown in the drawing in which a central core R is provided to which is applied a coating C which will be described more in detail hereafter. The coating C contains a suitable bonding agent such as sodium silicate; the coating may be applied by dipping or extrusion.

Various mixtures of alloying and fluxing materials may be employed in the coating. In the following table we set forth three suitable mixtures, the proportions being given in parts by weight.

|  | A | B | C |
|---|---|---|---|
| Calcium carbonate | 7.5 | | |
| Albany slip clay | 18 | 19 | 19 |
| Rutile | 3 | | |
| Manganese ore | 1.5 | | |
| High carbon chrome metal | 45.9 | 59.6 | 48 |
| High carbon ferrochrome | | | |
| Silico manganese | 11.5 | 9.9 | 6 |
| Low carbon ferromanganese | 7.6 | 6.6 | 22 |
| Cannel coal | 5 | 4.9 | 5 |

It will be seen that the constituents of the alloy additions contain carbon, manganese, silicon and chromium in the following approximate percentages by weight.

|  | A | B | C |
|---|---|---|---|
| Carbon | 4.8 | 3.7 | 3.0 |
| Manganese | 14.2 | 12.3 | 22.4 |
| Silicon | 2.6 | 2.2 | 1.4 |
| Chromium | 40 | 42.6 | 34.2 |

The above compositions are mixed with sodium silicate solutions to a plastic consistency suitable for coating by extrusion or to a consistency suitable for coating by dipping.

While the above specific flux compositions are mentioned there are numerous other flux compositions that could be used with the alloys to produce satisfactory results. Other highly volatile coals could be substituted for cannel coal to produce a gaseous protecting envelope around the arc, as set forth in the copending application of W. B. Miller, Serial No. 704,259, filed December 30, 1933.

Other metals may be added to the coating such as tungsten, nickel, cobalt, vanadium, and the like. Such additions will replace an equal amount of iron and will be in addition to the chromium-manganese and carbon as set forth above. These additions are employed when it is desired to make the rods suitable for various special purposes.

Welding rods were prepared having coatings of a composition in accordance with the above tables. The rods were of low carbon steel and the cores were $\frac{3}{16}$ inch in diameter but the coatings varied in thickness from .04 to 0.179 inch in thickness. The rods were coated by the extrusion method and deposits were made by the metallic arc welding method. The following results were obtained:

| Composition of coating | A | B | B | C | C | C |
|---|---|---|---|---|---|---|
| Thickness of coating in inches | .047 | .040 | .062 | .059 | .091 | .179 |
| Percent coating by weight | 28 | 24 | 38 | 39 | 52 | 73 |
| Composition of deposit-carbon | .98 | 1.05 | 1.09 | .95 | 1.44 | 2.65 |
| Manganese | 3.06 | 2.50 | 3.06 | 5.37 | 6.87 | 9.37 |
| Silicon | 1.15 | .94 | 1.73 | 1.40 | 1.83 | 2.21 |
| Chromium | 10.97 | 9.84 | 15.03 | 11.99 | 15.06 | 22.16 |
| Brinell hardness of deposit | 286 | 280 | 345 | 321 | 380 | 430 |

The rods with coating B, especially when the core contained from 0.9% to 1.1% carbon, worked satisfactorily in oxy-acetylene welding. The rods with high carbon steel cores and coated as described are also satisfactory for use as electrodes in arc welding.

While it is possible to add a part of the alloying elements in the form of oxides, carbides or other compounds of such a nature that they will be reduced or converted to their elemental form during the welding operation, it is preferred to add them as metallic elements or alloys. Other metals may be added to the coating when it is desired to make a special purpose rod. Examples of such elements are tungsten, molybdenum, nickel, cobalt and vanadium. When they are used they replace an equal amount of the iron.

We claim:

1. A welding rod comprising a ferrous core coated with a mixture of such composition that when used for welding it will produce a deposit containing chromium 3% to 40%, manganese 1% to 10%, carbon 0.5% to 3% and a substantial amount of silicon not in excess of 3%, said coating containing at least a part of the alloying elements.

2. A welding rod comprising a ferrous core and a coating thereon, said coating comprising flux material, binder, metallic compounds and alloys, the metallic elements being present in such an amount as to give a deposit consisting of chromium 3% to 40%, manganese 1% to 10%, carbon 0.5% to 3% and silicon in a substantial amount not in excess of 3%.

3. A welding rod comprising a ferrous core with a coating containing flux material, metallic compounds, carbonaceous material and metallic alloys, the metallic alloys having a composition consisting of carbon 3% to 5%, manganese 10% to 25%, silicon .1% to 3%, chromium 30% to 45% with the balance principally iron.

4. A welding rod comprising a ferrous core and a coating thereon, said coating comprising flux material, metallic oxides, high volatile coal and alloy material, said alloy material consisting of carbon in appreciable amounts, manganese 10% to 25%, silicon 1% to 3%, chromium 30% to 45%, a minor but substantial amount of a metal from the group consisting of tungsten, molybdenum, nickel, cobalt, vanadium and mixtures thereof, with the balance substantially iron.

5. A welding rod as claimed in claim 3 in which the metallic alloys comprise from about 65% to about 80% of the coating.

6. A welding rod as claimed in claim 3 in which the carbonaceous material is cannel coal.

7. A composite welding electrode comprising a ferrous core having a coating thereon, said coating comprising a binder, flux material about 15% to 30%, carbonaceous material about 5%, with the balance alloys of iron, chromium, manganese, silicon and carbon.

WILLIAM A. WISSLER.
WILBER B. MILLER.